United States Patent [19]

Sender

[11] Patent Number: 4,670,717

[45] Date of Patent: Jun. 2, 1987

[54] BOREHOLE ANTENNA ARRAY FOR DETERMINING RADAR INCIDENCE DIRECTION

[76] Inventor: Friedhelm Sender, Loccumer Str. 1, 3000 Hannover 81, Fed. Rep. of Germany

[21] Appl. No.: 586,949

[22] Filed: Mar. 7, 1984

[30] Foreign Application Priority Data

Mar. 8, 1983 [DE] Fed. Rep. of Germany ....... 3308559

[51] Int. Cl.$^4$ .......................... G01V 3/12; G01V 3/18; H01Q 21/00
[52] U.S. Cl. ...................................... 324/338; 343/726
[58] Field of Search .............................. 324/338–343; 343/726, 742, 788, 855

[56] References Cited

U.S. PATENT DOCUMENTS

| | | | |
|---|---|---|---|
| 2,256,619 | 9/1941 | Luck | 343/726 |
| 2,723,374 | 11/1955 | Williams | 324/343 |
| 3,286,163 | 11/1966 | Holser et al. | 324/338 |
| 3,412,815 | 11/1968 | Holser et al. | 324/338 |
| 3,440,523 | 4/1969 | Gabillard | 324/338 |
| 4,489,276 | 12/1984 | Yu | 324/338 |

OTHER PUBLICATIONS

Handbuch für Hochfrequenz- und Elektro-Techniker (Manual for High Frequency- and Electrotechnicians), vol. II, 1953, pp. 489–491.

Primary Examiner—Ernest F. Karlsen
Assistant Examiner—Walter E. Snow
Attorney, Agent, or Firm—Walter C. Farley

[57] ABSTRACT

An antenna arrangement for use in a bore hole to receive radar signals and produce electrical signals from which the incidence direction of the radar signals can be determined includes a cross coil arrangement with two coils having elongated sides mounted adjacent the outer surface of a cylindrical insulative probe body. In one embodiment, one cross coil assembly is used in conjunction with an omnidirectional antenna and an evaluation circuit. In another embodiment two axially aligned cross coil assemblies are connected to also be usable as an omnidirectional antenna.

4 Claims, 5 Drawing Figures

Fig.1
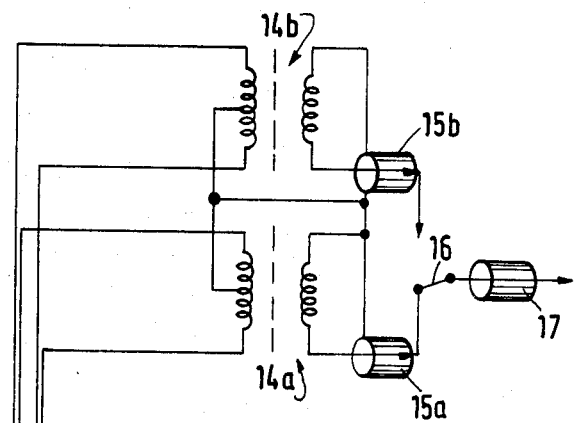
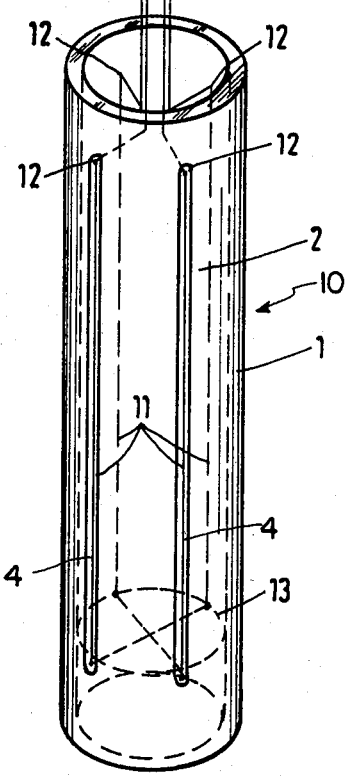

BOREHOLE ANTENNA ARRAY FOR DETERMINING RADAR INCIDENCE DIRECTION

This invention relates to a borehole measuring apparatus for receiving radar signals which includes a probe body and an improved antenna array.

BACKGROUND OF THE INVENTION

Borehole radar systems typically operate with electromagnetic waves in the short and ultrashort wave ranges. For these ranges, the available borehole diameter is very small relative to the wavelength. Heretofore, this fact has prevented the use of antenna arrangements which are usable so as to have a horizontal directional action. In the customary probes, only dipole antennae are used which, in the horizontal plane, have omnidirectional characteristics, and folded dipoles can also be used as shown in U.S. Pat. No. 3,286,163. Insofar as complicated antennae are used, such as for example, the Yagi arrangement shown in FIG. 4 of U.S. Pat. No. 3,286,163, it is a prerequisite that the parts of the antenna are opened up in a telescopic fashion so that they project beyond the outer cylindrical surface of the probe. Such an antenna arrangement presupposes boreholes having diameters which exceed the customary dimensions so that its use will not be limited to enlarged areas in a standard borehole.

In the vertical direction, a determination of the direction of reception of the radar signals received can be made because of the fact that measurements are made on a series of vertically successive measuring points. Thus, for the vertical resolution of direction, a directional antenna is not required although it could easily be constructed. It should be furthermore noted that for physical reasons no effective directional converging or focusing can be achieved with electric field sensors in narrow boreholes because a determination of the direction can be deduced only from the differential information of at least two sensors which must be spaced apart by a significant and determinable portion of one wavelength in the wave field.

Loop antennae have been used successfully for some time as so-called direction finding loops or direction receiving installations in radio engineering generally as discussed, for example, in Handbuch für Hochfrequenz- und Elektro-Techniker (Manual for High Frequency- and Electrotechnicians), Vol. II, 1953, pp 489 and 490. Because of the relatively low induced voltages, such loops are made, without exception, as selective arrangements for the narrow band reception of selected carrier frequencies. The induced voltage in a loop antenna is proportional to the surface of the loop, the frequency and the cosine of the angle of incidence of the wave front. Contrary to the omnidirectional pattern of a rod or dipole antenna, loop antennae have a double-circle response pattern in a horizontal direction with two distinct zero locations. With a properly adapted combination of a dipole and of a loop antenna, a cardioid pattern can be achieved with only one pole, a so-called zero position.

In order to determine the direction of incidence, the so-called direction finding loop is rotated around the vertical axis until a zero point is determined. This so-called minimum direction finding delivers the most precise results because of the steep characteristic of the zero points. When a rotatable direction-finding loop cannot be erected for reasons of construction or electricity, it is customary today to use a fixed, crossed loop antenna together with an electrical goniometer. When using such a goniometer, the field of the receiving crossed loop is reproduced by an arrangement of two coils positioned at right angles to each other and at the inside a rotary coil which serves as an exploring coil. The rotation of the exploring coil simulates a rotation of the loop antenna arrangement.

These known loop antenna arrangements can be advantageously used for the determination of the direction of incidence of discrete carrier frequencies. The combination used for the unequivocal determination of direction of a directional finding loop with an auxiliary antenna for circular reception requires very careful synchronization of the system and presupposes time-stable carrier frequencies.

These arrangements and processes, which have been known for a long time in radio engineering, could not heretofore be used for borehole measuring processes because of the lack of space.

BRIEF SUMMARY OF THE INVENTION

Accordingly, an object of the present invention is to provide an antenna arrangement which is usable in a borehole measuring process for determining the direction of incidence of radar signals.

Briefly described, the invention includes, in an improved borehole measuring apparatus for receiving radar signals, the apparatus being of the type including a probe body, an evaluation apparatus and an antenna array, the improvement wherein said antenna array comprises a rectangular frame coil having a longitudinal axis substantially coaxial with the central axis of the probe body, the coil having elongated conductor sections extending parallel with the central axis and mounted adjacent the outer surface of the probe body, and means for connecting the coil to the evaluation apparatus for determining the direction of incidence of received radar signals.

Although the dimensions of the usual boreholes provide very little space for the construction and deployment of usable antenna arrangements, the invention makes possible an optimal utilization of that space for deriving useful results. These results can be achieved even though the signals, the direction of incidence of which are to be determined, are very short and are relatively complicated wave trains. Resolution in a vertical plane is concurrently possible despite considerable variation of the direction of incidence in the previously described fashion. Thus, as compared with the prior art, considerable improvement can be achieved.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a simplified schematic diagram, partially in perspective and partly in schematic circuit form, of a first embodiment of an apparatus in accordance with the invention;

DETAILED DESCRIPTION OF THE DRAWINGS

Figure 2:
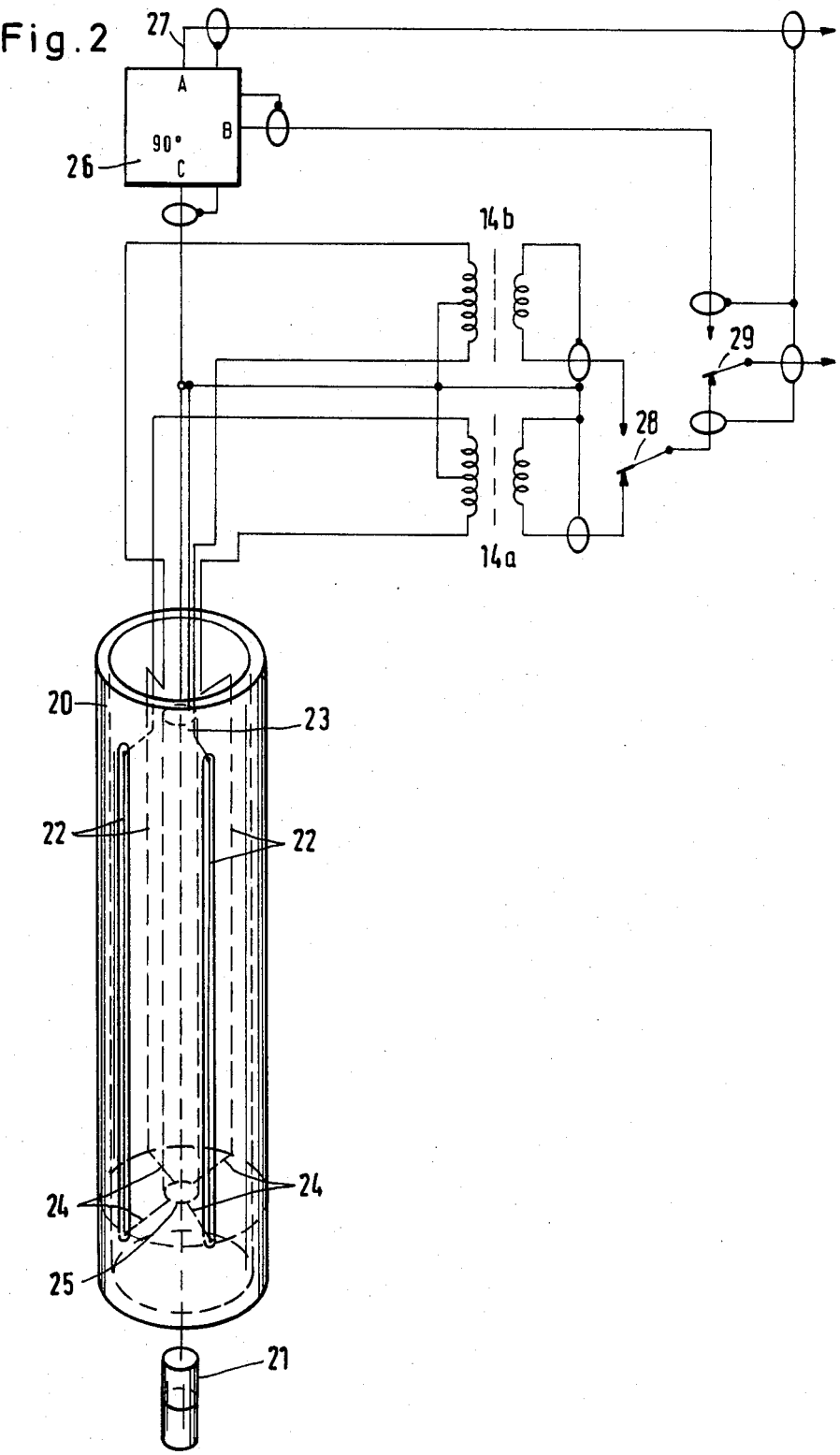
FIG. 2 is a more detailed illustration of an embodiment similar to FIG. 1 including a circuit arrangement for clearly defining the direction of the horizontal components of a received signal.

Referring first to FIG. 1, the apparatus shown therein includes a body 1 of a probe indicated generally at 10, the body and its contents being shown in a somewhat simplified form. A crossed-loop antenna 2 is contained within body 1, the antenna including perpendicular coil conductors 11 which are mounted in the outer surface of the probe body. In particular, the longitudinally extending portions of coils 11 are received within relatively shallow, flat grooves 4 formed in the outer surface of the probe body 1 which preferably consists of an insulating material. The radially extending cross connections between the longitudinally extending conductor portions 11 pass through pressure-tight passages 12 into the hollow interior of cylindrical probe body 1. The electrically bridged end of the coil can be connected jointly, for both coils, to a conductive outside ring 13 which can be mounted in the outer skin of probe body 1 in a manner similar to the longitudinally extending portions of the coils. The loop antennae connected to form a cross loop antenna 2 are greatly elongated rectangular coils, the width of each coil being determined by the maximum diameter of the probe itself. The ends of the pair of coils are matched by way of matching balancing transformers 14a, 14b to asymmetrical coaxial cables 15a and 15b. A switchable contact set 16 can be switched by an electronic relay to permit the connection of either of the two coaxial lines through a cable 17 to a receiving apparatus, not shown in FIG. 1, wherein the signals are successively recorded and are utilized in accordance with a further process to be hereinafter described.

Each of the loops of the cross coil arrangement 2 contains only one winding and the coils are not tuned but their inductive reactances are matched to the cable impedance approximately for the middle frequency of the frequency band to be expected. As a result of the resistive load across the amplifier input, the coils are thus matched over a rather broad band as to their performance.

Because the response pattern of a loop antenna is a double circle curve or a curve in the shape of the numeral 8, the determination of direction with the antenna according to FIG. 1 is ambiguous, that is to say, it is possible to obtain indications of direction which are separated by 180°. For the precise determination of direction, it is necessary to resolve this ambiguity by an additional measurement.

The arrangement according to FIG. 2 makes possible an unequivocal determination of the direction. The cross coil arrangement 20 shown therein is supplemented by an additional omnidirectional receiving antenna 21. This rod-shaped antenna 21 is preferably a non-symmetrically fed dipole or a sleeve-dipole antenna. In the antenna arrangement of FIG. 2, the feeding cable of the omnidirectional receiving antenna 21 is guided through a pipe 23 mounted in the center of cross coil antenna 20. In this structure, pipe 23 is preferably a conductive metal pipe which, for reasons of symmetry of the coil characteristics, extends exactly coaxially along the longitudinal axis of the coils. This pipe comprises a cylindrical body of high permeability within the cross coil assembly. The cross connections 24 of the lateral coil conductors 22 are advantageously closed simply by way of a guide ring 25 for pipe 23. As a result of that arrangement, mutual influencing of the two partial antenna systems 20, 21 of the antenna arrangement will be effectively avoided and the directional characteristics of the cross coil antenna 20 will be preserved undisturbed. Because the signals induced in the coil antenna of the cross coil 20 are phaseshifted by 90°, in accordance with the laws of induction, as compared with the electric field received by the omnidirectional receiving antenna 21, a 90° hybrid coupler 26 is connected in the antenna feedline of receiving antenna 21. The third arm 27 of this T-coupler 26 can be either terminated with a reactive impedance or can be used, as shown, as a trigger signal source for the receiving apparatus. Beside the trigger signal which serves as a time reference for all receptions, it is possible to selectively feed the signal from the omnidirectional receiving antenna 21 or the signals from either one of the two orthogonal loops by way of two coaxial relays 28, 29 of the receiving apparatus. The arrangement with the matching transformers 14a, 14b corresponds to FIG. 1.

Figure 3:
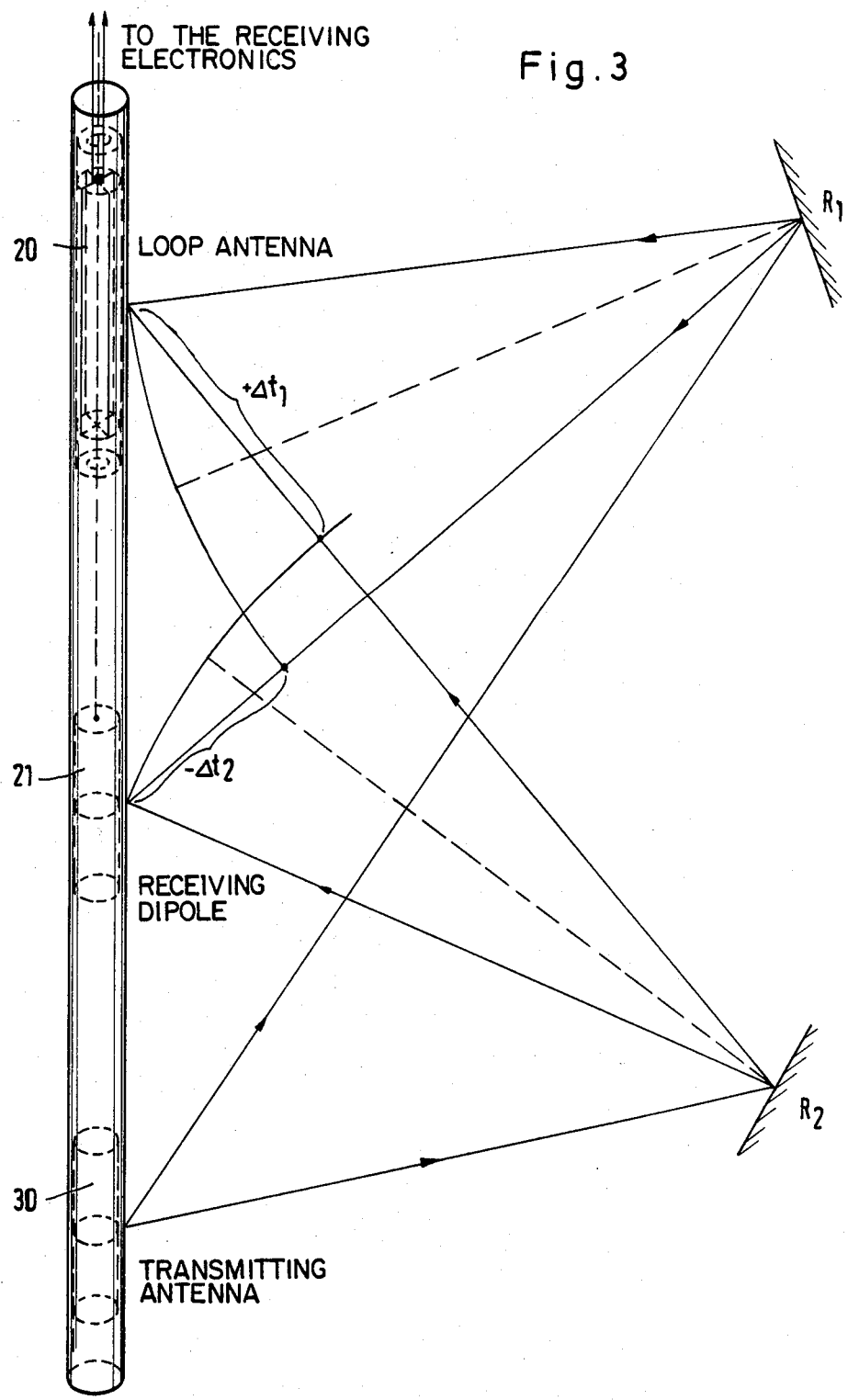
FIG. 3 is a diagram illustrating the signal paths involved in the use of an apparatus in accordance with FIG. 2.

FIG. 3 shows a set of circumstances of use of the apparatus of FIG. 2. In practical use, the receiving situation shown in FIG. 3 results from the distance between the omnidirectional receiving antenna 21 and the loop antenna 20. A transmitting antenna 30 is suspended so as to be axially separated from the receiving antenna arrangement including antennaes 20 and 21 and is contained in the same probe body below the receiving arrangement. The geometric configuration shown in FIG. 3 wherein the trains of waves emanating from the transmitting antenna 30 are reflected from reflective surfaces $R_1$ and $R_2$ results in the situation that each of the reflections from $R_1$ and $R_2$ at antennaes 20 and 21 has differences of travel time, i.e., the transmission times from either surface to the antennae differs as a function of the angular separation. These differences of travel time which are illustrated in FIG. 3 as compared to a mean or median ray result in time differences $\Delta t$ which must be determined and corrected for each individual reflection.

Figure 4:
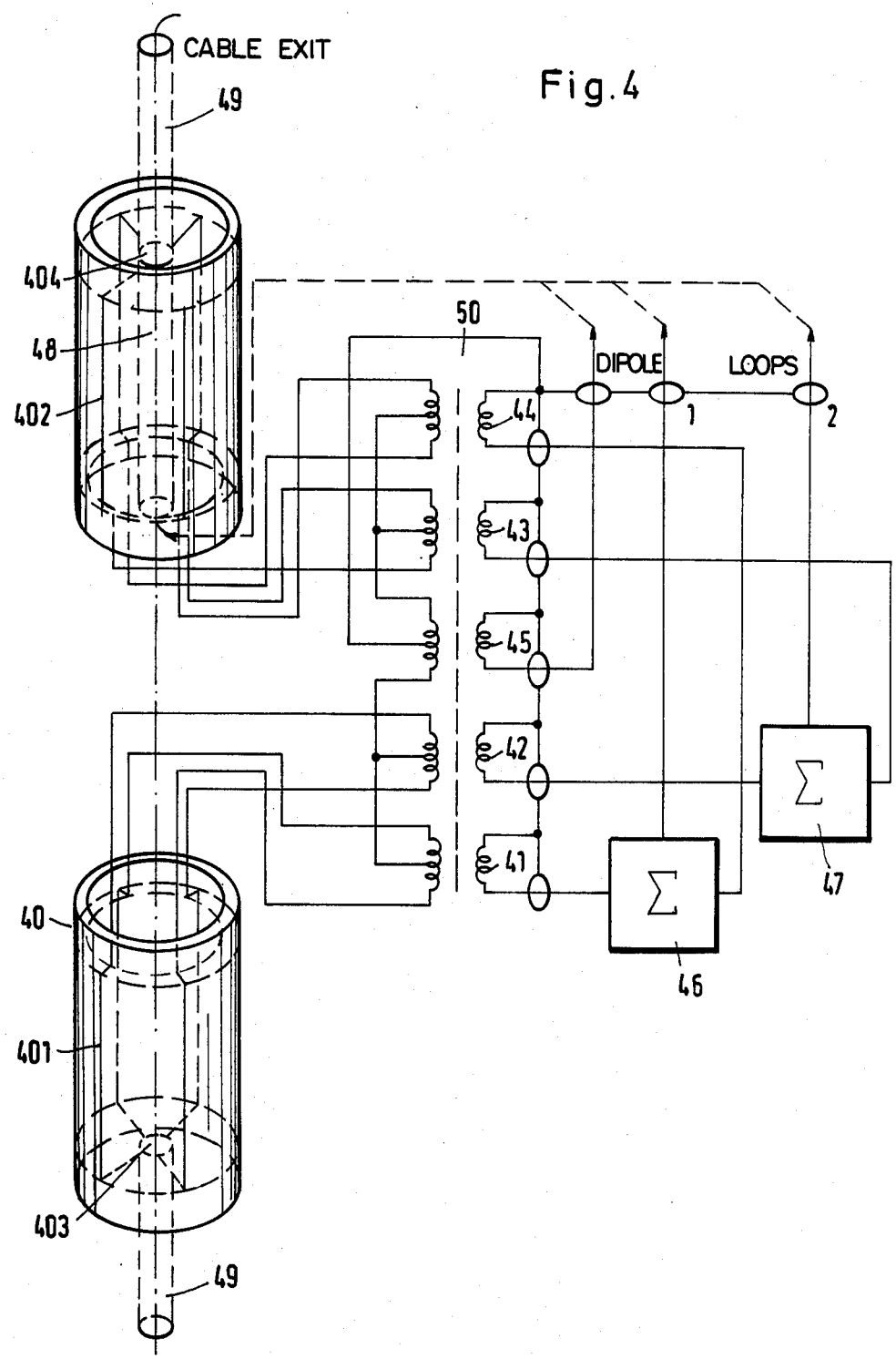
FIG. 4 is an illustration of a further embodiment of an apparatus in accordance with the invention including components contained within the probe.

FIG. 4 shows a further improved antenna arrangement 40 with appropriate pertinent circuitry parts housed in the probe body. In this improved antenna arrangement, subsequent determination of the travel time difference and deduction of a suitable correction is not required because the components of the antenna arrangement 40 are assembled in such a way that they have a common electric center. The antenna arrangement 40 comprises two stacked crossed loops 401 and 402 which are connected by way of a decoupling circuit 50 in such a way that the two loop structures 401, 402 can also be used as halves of an omnidirectional dipole receiving antenna.

The decoupling circuit 50 contains symmetrizing transformers 41, 42 for the lower cross loops 401 and symmetrizing transformers 43, 44 for the upper cross loops 402. The outputs of the partial coils lying in the same planes, i.e., the outputs of transformers 41 and 44 on the one hand, and 42 and 43 on the other hand, are always added by way of a summing circuit 46 or 47 and are, in this way, brought together as the two customarily orthogonal coil outputs. The centers of the primary windings of transformers 41, 42 of the lower cross coil 401, and of transformers 43, 44 of the upper cross coil 402 are connected to the primary winding of an additional matching transformer 45 in a push-pull manner. Thus, at the output of transformer 45 appears the differential EMF which exists between the two cross coils which, thus, act together like a dipole antenna. The matching networks are disposed in the electrical center between the two cross coils, as schematically shown in FIG. 4. The output lines are advantageously passed through a pipe 48, similar to pipe 23, extending along the axis of cross frame 402 lying adjacent the actual receiving apparatus, in a one-sided manner, similarly to the arrangement according to FIG. 2. This permits unobstructed housing of the antenna arrangement in probe bodies which are suitable for narrow boreholes.

When dealing with large diameter borehole probes, there is the possibility that because of the rather large coil surfaces caused by the necessary length of the dipole, the inductivity assumes values which are too great for resonance-free, broad-band tuning.

The actual coils 401, 402 can then be made shorter and can be provided with central extensions 49 which begin at the neutral points of the coil connection 403 or 404 and which permit operation as dipoles of optimal length despite the shortening of the actual coils.

In order for the antenna signals to be conducted further, the relay arrangement with a hybrid coupler of 90° as shown in FIG. 2 has been provided.

In the antenna arrangement according to FIG. 4, the electrical central points of the coil antennae and the omnidirectional antenna coincide precisely because of the structural arrangement so that corrections of travel time are not required The previously described cross coils are always fixedly mounted in the probe body. For determining the direction, it is not necessary to turn the frame. It is merely necessary to determine the geographic alignment of the probe for each measuring point in order to make possible coordination of the direction of incidence of the reflecting layers with geographic coordinates.

For this purpose, a magnetic compass is built into the probe body, for example, the reading or position of which is determined at each measuring point and electrically transmitted to the receiving arrangement at the surface. Such magnetic compass systems have been known per se.

In addition to the compass information, the following are determined at each measuring point with the embodiments according to FIGS. 2 and 4:
(a) the receiving values of the omnidirectional antenna,
(b) the receiving values of an antenna coil; and
(c) the receiving values of the antenna coil orthogonal thereto.

From these data, it is possible to obtain the directional information for any angle of rotation which can be theoretically assumed by a frame antenna by vectorial addition of the received voltages. With a calculating apparatus used for the evaluation, and to be connected to the receiving apparatus, it is thus possible to simulate rotation of the frame antenna at selectable angular steps in such a way as would have been done during the reception when using a mechanically rotatable frame antenna.

The process known from radio engineering of obtaining a cardioid with a clear zero position by phase correction coupling of the receiving signals of an omnidirectional antenna into the signals of the coil lying coaxially thereto can basically not be used in connection with broad band, pulse-shaped signals of the radar echos. An important prerequisite for the superposition of the signals is a maximum of signature conformity of the pulse shapes for both antenna signals. This is basically present in the case of the narrow band sine signals customary in radio engineering. In the complex form of the radar signals, however, the characteristics of the two types of antenna cannot be tuned in practice in such a way that a complete elimination of the signal is clearly recognizable in one definite zero position. On the other hand, the relative phase position of the signal trains can fundamentally be well-recognized.

Therefore, it is recommended for the evaluation process that one determine the angle of one of the two zero positions which belongs to the directional pattern of the coil for each individual train of reflection impulses first of all with the coil antenna information alone. To control the results, it is also possible to determine the second zero position. In the case of clear relationships, the second zero position must be disposed exactly 180° away from the first zero position. Then, for example, turning toward the right, the maximum of the loop antenna signal is determined and is shown together with the signal of the omnidirectional antenna. Whenever both signals are preponderantly in phase, then the direction of incidence equals the zero signal angle plus 90°. When the signals are in phase opposition, then the angle of incidence is equal to the zero angle minus 90°.

Figure 5:
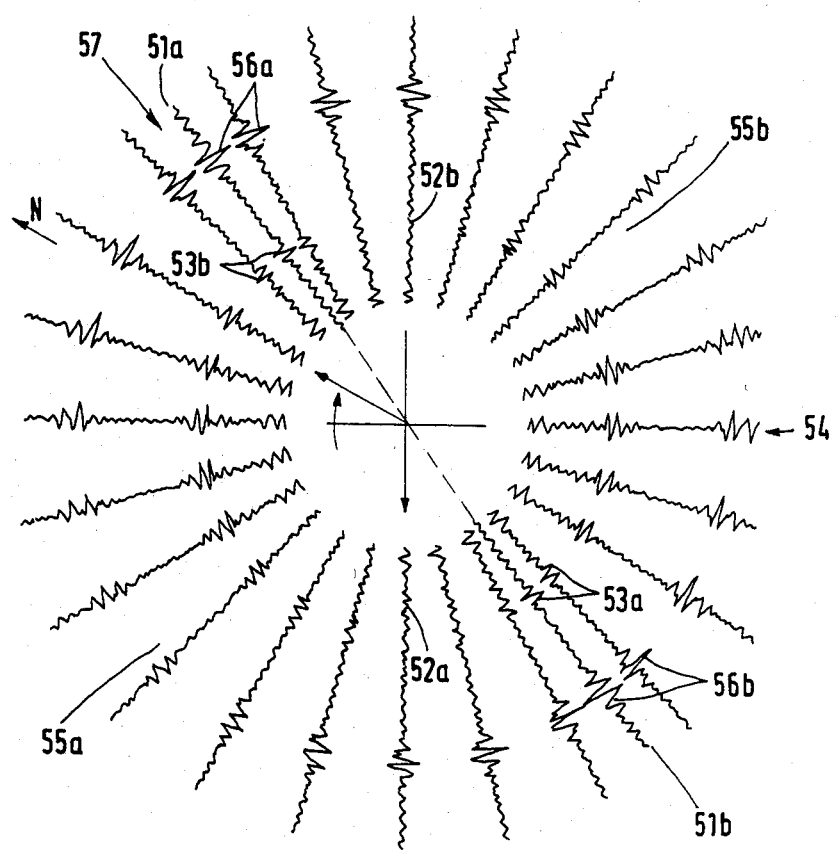
FIG. 5 is an illustration of an evaluation process for the determination of the direction of incidence.

This process permits the evaluation of radar signals received within an arrangement according to either FIGS. 2 or 4 quickly and effectively and it is thereby possible to determine the direction of incidence of the signals FIG. 5 shows a practical example of the evaluation process for the determination of the direction of incidence.

The corresponding vectorially added coil antenna signals are recorded in 15° steps in a predetermined orientation relative to North. The dipole received signal is then inserted at suitable points (51a, 51b) which are displaced from each other by 180°. Examining the diagram of FIG. 5 circularly, it will be recognized that the first reflection, radially inwardly, has minima at 52a and 52b. Thus, the two directions perpendicular to the line containing those signals become candidates for the correct direction of incidence.

A comparison of signatures with the dipole reception shows at 53a an equal phase behavior contrary to 53b. Thus, the direction of incidence is given from that side at which the in-phase relationship exists, i.e., at 54.

The second reflection has minima at 55a and 55b. The comparison of signatures with the dipole shows an in-phase relationship at 56a and phase opposition at 56b. Thus, the direction of incidence for that signal is shown at arrow 57.

While certain advantageous embodiments have been chosen to illustrate the invention it will be understood by those skilled in the art that various changes and modifications can be made therein without departing from the scope of the invention as defined in the appended claims.

What is claimed is:

1. In an improved bore hole measuring apparatus with an antenna array for receiving radar signals and for determining the direction of incidence of the radar signals, the apparatus being of the type including a probe body, an evaluation apparatus and antenna array connected to the evaluation apparatus, the improvement wherein said antenna array comprises first and second rectangular frame coils each having a central longitudinal axis substantially coaxial with the central axis of the probe body, said second frame coil lying in a plane perpendicular to said first coil such that said first and second coils form a cross coil assembly, each of said coils having elongated conductor sections extending parallel with said central axis and mounted adjacent the outside surface of said probe body;

third and fourth rectangular frame coils mounted in a second cross coil assembly substantially identical with the first cross coil assembly and axially spaced therefrom;

decoupling circuit means interconnecting said cross coil assemblies to function as an antenna with omnidirectional characteristics;

an omnidirectional antenna supported on said probe body in coaxial relationship with said cross coil assemblies; and means for connecting said coils and said omidirectional antenna to said evaluation apparatus.

2. An apparatus according to claim 1 wherein said probe body is made of an insulating material and includes means defining a plurality of longitudinally extending shallow grooves in the outer surface of said body for receiving said conductor sections extending parallel with said central axis, first and second conductive rings mounted adjacent the outer surface of said probe body and connected to said conductor sections of each of said cross coil assemblies at the ends of each of said cross coil assemblies opposite to the junctions with the evaluation apparatus; and wherein each of said coils includes radially extending conductor portions extending through passages in said probe body from said elongated conductor sections to the interior of said body, said body including means for pressure-sealing said passages.

3. An apparatus according to claim 1, and further including a cylindrical body of magnetic material of high permeability within each of said cross coil assemblies for enhancing the induced voltages by concentrating the magnetic flux lines.

4. In an improved bore hole measuring apparatus with an antenna array for receiving radar signals and for determining the direction of incidence of the radar signals, the apparatus being of the type including a probe body, an evaluation apparatus and an antenna array connected to the evaluation apparatus, the improvement wherein said antenna array comprises first and second rectangular frame coils each having a central longitudinal axis substantially coaxial with the central axis of the probe body, said second frame coil lying in a plane perpendicular to said first coil such that said first and second coils form a cross coil assembly, each of said coils having elongated conductor sections extending parallel with said central axis and mounted adjacent the outside surface of said probe body;

third and fourth rectangular frame coils mounted in a second cross coil assembly substantially identical with the first cross coil assembly and axially spaced therefrom;

an omnidirectional antenna supported on said probe body in coaxial relationship with said cross coil assemblies; and means for connecting said coils and said omidirectional antenna to said evaluation apparatus;

said probe body being made of an insulating material and including means defining a plurality of longitudinally extending shallow grooves in the outer surface of said body for receiving said conductor sections extending parallel with said central axis;

first and second conductive rings mounted adjacent the outer surface of said probe body and connected to said conductor sections of each of said cross coil assemblies at the ends of each of said cross coil assemblies opposite to the junctions with the evaluation apparatus; and each of said coils including radially extending conductor portions extending through passages in said probe body from said elongated conductor sections to the interior of said body, said body including means for pressure-sealing said passages;

said probe further including a central coaxial pipe extending through the one of said first and second cross coil assemblies closest to the evaluation apparatus for receiving an electrical feeder extending between said antenna array and said evaluation apparatus and wherein said decoupling circuit means is located between said cross coil assemblies, and wherein the connections between sections of said cross coil assembly extend circularly around said pipe.

* * * * *